United States Patent [19]
Nakajima

[11] Patent Number: 5,758,030
[45] Date of Patent: May 26, 1998

[54] FUZZY RETRIEVAL APPARATUS AND METHOD

[75] Inventor: Hiroshi Nakajima, Kyoto, Japan

[73] Assignee: Omron Corporation, Kyoto, Japan

[21] Appl. No.: 762,962

[22] Filed: Dec. 10, 1996

Related U.S. Application Data

[63] Continuation of Ser. No. 204,336, filed as PCT/JP92/01275 Oct. 2, 1992, Pat. No. 5,583,966.

[30] Foreign Application Priority Data

Oct. 4, 1991 [JP] Japan ................................. 3-257645

[51] Int. Cl.$^6$ ................................................ G06F 9/44
[52] U.S. Cl. ................... 395/51; 395/3; 395/61; 395/900
[58] Field of Search ................... 395/51, 3, 61, 395/900

[56] References Cited

U.S. PATENT DOCUMENTS

| | | | |
|---|---|---|---|
| 5,305,425 | 4/1994 | Ishida et al. | 395/900 |
| 5,369,742 | 11/1994 | Kurosu et al. | 395/147 |
| 5,384,894 | 1/1995 | Vassiliadis et al. | 395/61 |
| 5,388,259 | 2/1995 | Fleischman et al. | 395/600 |
| 5,414,797 | 5/1995 | Vassiliadis et al. | 395/51 |
| 5,537,514 | 7/1996 | Nishidai | 395/51 |

OTHER PUBLICATIONS

K.S. Leung et al., "A Fuzzy Expert Database System", *Data & Knowledge Engineering* 4, pp. 287–304 (1989).

"IEEE International Conference on Fuzzy Systems," T. Nomura et al., 12 Mar. 1992, San Diego, CA pp. 753–760, Generating Ambiguous Attributes for Fuzzy Queries.

"Microprocessing and Microprogramming", J. Lee et al., Amsterdam 35(Jan. 5):337–344, Enhancing the Fuzzy set Model for High Quality Document Rankings.

"ACM SIGIR 11th International Conference on Research & Development in Information Retrieval", P. Bosc et al., 15 Jun. 1988, pp. 433–449, Flexible Selection Among Objects: A Framework Based on Fuzzy Sets.

Miyamoto, "Two-approaches for information retrieval through fuzzy associations", IEEE Transactions on Systems, Man, and Cybernetics, vol. 19(1), pp. 123–103 (Jan. 1989).

*Primary Examiner*—George B. Davis
*Attorney, Agent, or Firm*—Dickstein Shapiro Morin & Oshinsky LLP

[57] ABSTRACT

The present invention provides an apparatus and method in which it is possible to set information retrieval conditions wherein the user's intention in performing retrieval is reflected satisfactorily, and in which fuzzy retrieval can be performed in accordance with the retrieval conditions thus set. According to the present invention, the user, in the setting of retrieval conditions, is capable of freely connecting preconditions, which represent the desired conditions with regard to attribute signals in a data base, using one or a plurality of MEAN, MIN and MAX operations. Accordingly, it is possible to set retrieval conditions that fully reflect the intentions of the user. Moreover, fuzzy retrieval processing in accordance with retrieval conditions set by the user is executed and retrieved results reflecting the intentions of the user are obtained.

10 Claims, 18 Drawing Sheets

Fig. 4

INPUT INFORMATION

| NAME OF MACHINE TYPE | PRICE OF MAIN BODY (IN 10,000-YEN UNITS) | PROCESSING SPEED (MIPS) | MEMORY CAPACITY (MB) | NAME OF MANUFACTURER |
|---|---|---|---|---|
| VV | 150 | 4 | 16 | COMPANY A |
| WW | ABOUT 250 | ABOUT 7 | 32 | COMPANY B |
| XX | 300 | ABOUT 30 | 64 | COMPANY C |
| YY | ABOUT 500 | ON THE ORDER OF THAT OF MACHINE A | 128 | COMPANY D |
| ZZ | ABOUT 300 | VERY FAST | 30 | COMPANY E |

Fig. 5

DATA BASE

| NAME OF MACHINE TYPE | PRICE OF MAIN BODY | | | PROCESSING SPEED | | | MEMORY CAPACITY | | | NAME OF MANUFACTURER |
|---|---|---|---|---|---|---|---|---|---|---|
| | (IN 10,000 YEN UNITS) | STATUS | DEGREE OF CREDIBILITY | (MIPS) | STATUS | DEGREE OF CREDIBILITY | (MB) | STATUS | DEGREE OF CREDIBILITY | |
| VV | 150 | (CRISP NUMBER) | 100 | 4 | (CRISP NUMBER) | 100 | 16 | (CRISP NUMBER) | 100 | COMPANY A |
| WW | 250 | (FUZZY NUMBER) | 95 | 7 | (FUZZY NUMBER) | 90 | 32 | (CRISP NUMBER) | 100 | COMPANY B |
| XX | 300 | (CRISP NUMBER) | 100 | 30 | (FUZZY NUMBER) | 95 | 64 | (CRISP NUMBER) | 100 | COMPANY C |
| YY | 500 | (FUZZY NUMBER) | 80 | 2 | (FUZZY LABEL) | 70 | 128 | (CRISP NUMBER) | 100 | COMPANY D |
| ZZ | 300 | (FUZZY NUMBER) | 65 | — | (FUZZY LABEL) | 30 | 30 | (CRISP NUMBER) | 100 | COMPANY E |

| FUZZY LABEL NAME | FUZZY LABEL NUMBER | MEMBERSHIP FUNCTION COORDINATES |
|---|---|---|
| VERY FAST | 1 | 45, 50 |
| FAST | 2 | 30, 35 |
| MEDIUM | 3 | 15, 20, 30, 35 |
| SLOW | 4 | 15, 20 |
| VERY SLOW | 5 | 5, 7 |
| VERY HIGH | 1 | |
| HIGH | 2 | |
| MEDIUM | | |

| ATTRIBUTE | FUZZY NUMBER RATIO |
|---|---|
| PRICE OF MAIN BODY | 20 |
| PROCESSING SPEED | 10 |

FUZZY DATA DICTIONARY

Fig. 12

| NAME OF MACHINE TYPE | PRICE OF MAIN BODY DEGREE OF MEMBERSHIP Ag | PROCESSING SPEED DEGREE OF MEMBERSHIP Bg | MEMORY CAPACITY DEGREE OF MEMBERSHIP Cg | NAME OF MANUFACTURER DEGREE OF MEMBERSHIP Dg |
|---|---|---|---|---|
| VV | 100 | 0 | 0 | 100 |
| WW | 63 | 0 | 100 | 0 |
| XX | 20 | 62 | 100 | 0 |
| YY | 0 | 43 | 100 | 0 |
| ZZ | 39 | 100 | 0 | 0 |

Fig. 13

| NAME OF MACHINE TYPE | PRICE OF MAIN BODY | | | PROCESSING SPEED | | | MEMORY CAPACITY | | | NAME OF MANUFACTURER | | |
|---|---|---|---|---|---|---|---|---|---|---|---|---|
| | DEGREE OF CREDI-BILITY | DEGREE OF ATTACHED SIGNIFI-CANCE | DEGREE OF IMPOR-TANCE $A_w$ | DEGREE OF CREDI-BILITY | DEGREE OF ATTACHED SIGNIFI-CANCE | DEGREE OF IMPOR-TANCE $B_w$ | DEGREE OF CREDI-BILITY | DEGREE OF ATTACHED SIGNIFI-CANCE | DEGREE OF IMPOR-TANCE $C_w$ | DEGREE OF CREDI-BILITY | DEGREE OF ATTACHED SIGNIFI-CANCE | DEGREE OF IMPOR-TANCE $D_w$ |
| VV | 100 | 80 | 80 | 100 | 90 | 90 | 100 | 90 | 90 | 100 | 70 | 70 |
| WW | 95 | 80 | 76 | 90 | 90 | 81 | 100 | 90 | 90 | 100 | 70 | 70 |
| XX | 100 | 80 | 80 | 95 | 90 | 85.5 | 100 | 90 | 90 | 100 | 70 | 70 |
| YY | 80 | 80 | 64 | 70 | 90 | 63 | 100 | 90 | 90 | 100 | 70 | 70 |
| ZZ | 65 | 80 | 52 | 30 | 90 | 27 | 100 | 90 | 90 | 100 | 70 | 70 |

Fig.15

| COLUMN NO. | | | |
|---|---|---|---|
| 1 | val | Dg | (Dw) |
| 2 | val | Cg | (Cw) |
| 3 | val | Bg | (Bw) |
| 4 | val | Ag | (Aw) |
| 5 | ope | MEAN | (3) |
| 6 | ope | MIN | (2) |

Fig.16a

| i | Fi | Vi |
|---|---|---|

Fig.16b

| i | Fi | Oi | (Ni) |
|---|---|---|---|

Fig.17

LIFO BUFFER

|   |
|---|
|   |
|   |
|   |
| Ag (Aw) |
| Bg (Bw) |
| Cg (Cw) |
| Dg (Dw) |

Fig. 18

| COLUMN NO. | | | |
|---|---|---|---|
| 1 | val | Dg | (Dw) |
| 2 | val | Cg | (Cw) |
| 3 | ope | MAX | (2) |
| 4 | val | Bg | (Bw) |
| 5 | val | Ag | (Aw) |
| 6 | ope | MEAN | (2) |

Fig.19

MIN (MEAN (A, B, C), D)

| NAME OF MACHINE TYPE | PRICE OF MAIN BODY | | PROCESSING SPEED | | MEMORY CAPACITY | | NAME OF MANUFACTURER | | DEGREE OF CONCURRENCE G | DEGREE OF IMPORTANCE W |
|---|---|---|---|---|---|---|---|---|---|---|
| | DEGREE OF MEMBER-SHIP $A_g$ | DEGREE OF IMPORTANCE $A_w$ | DEGREE OF MEMBER-SHIP $B_g$ | DEGREE OF IMPORTANCE $B_w$ | DEGREE OF MEMBER-SHIP $C_g$ | DEGREE OF IMPORTANCE $C_w$ | DEGREE OF MEMBER-SHIP $D_g$ | DEGREE OF IMPORTANCE $D_w$ | | |
| VV | 100 | 80 | 0 | 90 | 0 | 90 | 100 | 60 | 30.7 | 86.6 |
| WW | 63 | 76 | 0 | 81 | 100 | 90 | 0 | 60 | 0 | 60 |
| XX | 20 | 80 | 62 | 85.5 | 100 | 90 | 0 | 60 | 0 | 60 |
| YY | 0 | 64 | 43 | 63 | 100 | 90 | 0 | 90 | 0 | 60 |
| ZZ | 39 | 52 | 100 | 27 | 0 | 90 | 0 | 60 | 0 | 60 |

Fig. 20

MEAN {A, B, MAX (C, D)}

| NAME OF MACHINE TYPE | PRICE OF MAIN BODY | | PROCESSING SPEED | | MEMORY CAPACITY | | NAME OF MANUFACTURER | | DEGREE OF CONCURRENCE G | DEGREE OF IMPORTANCE W |
|---|---|---|---|---|---|---|---|---|---|---|
| | DEGREE OF MEMBERSHIP $A_g$ | DEGREE OF IMPORTANCE $A_w$ | DEGREE OF MEMBERSHIP $B_g$ | DEGREE OF IMPORTANCE $B_w$ | DEGREE OF MEMBERSHIP $C_g$ | DEGREE OF IMPORTANCE $C_w$ | DEGREE OF MEMBERSHIP $D_g$ | DEGREE OF IMPORTANCE $D_w$ | | |
| VV | 100 | 80 | 0 | 90 | 0 | 90 | 100 | 60 | 60.8 | 76.6 |
| WW | 63 | 76 | 0 | 81 | 100 | 90 | 0 | 60 | 55.8 | 82.3 |
| XX | 20 | 80 | 62 | 85.5 | 100 | 90 | 0 | 60 | 62.2 | 85.2 |
| YY | 0 | 64 | 43 | 63 | 100 | 90 | 0 | 60 | 55.0 | 71.0 |
| ZZ | 39 | 52 | 100 | 27 | 0 | 90 | 0 | 60 | 28.0 | 56.3 |

Fig.22

MIN (MEAN (A, B, C), D)

| NAME OF MACHINE TYPE | DEGREE OF CONCURRENCE G | DEGREE OF IMPORTANCE W | DEGREE OF CONTRIBUTION | | | |
|---|---|---|---|---|---|---|
| | | | PRECONDITION A | PRECONDITION B | PRECONDITION C | PRECONDITION D |
| VV | 30.7 | 86.6 | ○ | ○ | ○ | 100 |
| WW | ○ | 60 | 100 | ○ | ○ | ○ |
| XX | ○ | 60 | 100 | ○ | ○ | ○ |
| YY | ○ | 60 | 100 | ○ | ○ | ○ |
| ZZ | ○ | 60 | 100 | ○ | ○ | ○ |

FUZZY RETRIEVAL APPARATUS AND METHOD

This application is a continuation of application Ser. No. 08/204,336, filed as PCT/JP92/01275 Oct. 2, 1992, U.S. Pat. No. 5,583,966.

TECHNICAL FIELD

This invention relates to a fuzzy retrieval apparatus and method.

BACKGROUND ART

Fuzzy retrieval is a retrieval method that allows fuzziness of data stored in a data base or fuzziness of retrieval conditions.

Fuzzy retrieval in the conventional fuzzy retrieval apparatus is executed in the following manner: A given retrieval condition is expressed by a membership function. From the data that has been stored in a data base, the data that corresponds to the retrieval condition is read out and the degree of membership with respect to the membership function representing the retrieval condition of the data that has been read out is calculated. Processing for calculating degree of membership is executed with regard to all retrieval conditions and with regard to all data corresponding to the retrieval conditions. The values of the degrees of membership thus obtained are subjected to a MEAN operation for obtaining the mean value of these values, a MIN operation for obtaining the minimum value of these values or a MAX operation for obtaining the maximum value of these values, and the result of the operation is outputted as degree of concurrence.

However, in a case where the MIN operation or MAX operation is used, a large discrepancy appears in the results of retrieval even with a small difference in the retrieval conditions or membership functions, and a problem that arises is that the user's intention in performing retrieval cannot be expressed accurately. In addition, when the MEAN operation is utilized, a problem encountered is that absolutely essential conditions or at least conditions that are required cannot be expressed accurately.

In other words, with the conventional fuzzy retrieval apparatus, it is difficult to set retrieval conditions in line with the user's intention in performing retrieval.

DISCLOSURE OF THE INVENTION

The present invention provides an apparatus and method in which it is possible to set retrieval conditions wherein the user's intention in performing retrieval is reflected satisfactorily, and in which fuzzy retrieval can be performed in accordance with the retrieval conditions thus set.

A fuzzy retrieval apparatus according to the present invention comprises a data base in which attribute signals of a plurality of types regarding items are registered in advance for each item, means for setting signals representing a retrieval condition which comprises a plurality of preconditions indicating desired conditions relating to at least some of the attribute signals of the plurality of types, and a connecting condition that connects these preconditions, membership operating means for producing signals representing degrees of membership that indicate the degrees to which an attribute signal conforms to a set precondition, MEAN operating means for producing and outputting a signal indicating a mean value of a plurality of applied degree-of-membership signals, MIN operating means for selecting and outputting a signal, which indicates a minimum value, from a plurality of applied degree-of-membership signals, MAX operating means for selecting and outputting a signal, which indicates a maximum value, from a plurality of applied degree-of-membership signals, and control means for applying the degree-of-membership signals obtained from the membership operating means to at least one of the MEAN operating means, MIN operating means and MAX operating means in accordance with a connecting condition that has be en set, and outputting a signal representing degree of concurrence obtained from a final stage of the operating means.

The term "signal" as used herein is a concept that covers the data.

In an embodiment of the present invention, the means for setting retrieval conditions is input means for entering retrieval-condition signals. In another embodiment, the means for setting retrieval conditions comprises means for storing a plurality of retrieval-conditions signals in advance, and means for selecting some retrieval-condition signals from the retrieval-condition signals that have been stored.

The membership operating means produces a degree-of-membership signal for each item with regard to all preconditions that have been set. Further, the control means controls the operating means in such a manner that a degree-of-concurrence signal is obtained for each and every item.

Preferably, the MEAN operating means, MIN operating means and MAX operating means are each provided in a plurality of stages and the control means applies an output signal from the MEAN operating means, the MIN operating means or the MAX operating means to at least one of MEAN operating means, MIN operating means and MAX operating means in accordance with the connecting condition that has been set.

In a further preferred embodiment, means are provided for producing a signal representing the weight of a degree-of-membership signal. The MEAN operating means, MIN operating means and the MAX operating means perform operations corresponding to a MEAN operation, MIN operation and MAX operation, respectively, with regard to weight signals applied together with the degree-of-membership signals. The control means applies the weight signals to at least one of MEAN operating means, MIN operating means and MAX operating means together with the degree-of-membership signals and outputs a signal, which represents degree of importance obtained from the final stage of the operating means, together with the degree-of-concurrence signal.

In one embodiment, the means for producing the weight signal comprises a data base in which, together with the attribute signals, there are registered signals representing degrees of credibility of the attribute signals, means for entering a signal, which represents degree of attached significance, for each attribute, and multiplying means for multiplying a signal representing degree of credibility and a signal representing degree of attached significance together and outputting a weight signal.

In another embodiment, the means for producing the weight signal is a data base in which, together with the attribute signals, there are registered weight signals representing degrees of credibility of the attribute signals.

In yet another embodiment, the means for producing the weight signal is realized as means for entering, for each attribute, a weight signal representing degree of attached significance of the attribute.

A fuzzy retrieval method according to the present invention comprises the steps of: registering, in a data base in advance, and for each item, attribute signals of a plurality of types regarding these items, and setting signals representing a retrieval condition comprising a plurality of preconditions indicating desired conditions relating to at least some of the attribute signals of the plurality of types, and a connecting condition that connects these preconditions; producing signals representing degrees of membership that indicate the degrees to which an attribute signal conforms to a set precondition; executing at least one of a MEAN operation, MIN operation and MAX operation in accordance with a connecting condition that has been set and with regard to the degree-of-membership signals obtained from membership operating means, wherein the MEAN operation is for producing a signal indicating a mean value of the degree-of-membership signals, the MIN operation is for selecting a signal, which indicates a minimum value, from the degree-of-membership signals, and the MAX operation is for selecting a signal, which indicates a maximum value, from the degree-of-membership signals, and outputting a signal representing degree of concurrence obtained by executing the operation.

According to the present invention, the user, in the setting of retrieval conditions, is capable of freely connecting preconditions, which represent the desired conditions with regard to attribute signals in the data base, using one or a plurality of MEAN, MIN and MAX operations. Accordingly, it is possible to set retrieval conditions that fully reflect the intentions of the user. Moreover, fuzzy retrieval processing in accordance with retrieval conditions set by the user is executed and retrieved results reflecting the intentions of the user are obtained.

BRIEF DESCRIPTION OF THE DRAWINGS

FIG. 4 illustrates an example of input information;

FIG. 5 illustrates an example of the content of a data base;

FIG. 12 illustrates an example of degrees of membership obtained;

FIG. 13 illustrates degrees of importance obtained from degrees of credibility and degrees of attached significance;

FIG. 15 illustrates columns prepared for the sake of connection processing;

FIGS. 16a and 16b illustrate symbols used in the columns;

FIG. 17 illustrates an LIFO buffer;

FIG. 18 illustrates columns prepared for the sake of other connection processing;

FIGS. 19 and 20 illustrate examples of degrees of concurrence and degrees of importance obtained from degrees of membership and degrees of importance;

FIG. 22 illustrates calculated degrees of contribution.

BEST MODE FOR CARRYING OUT THE INVENTION

Figure 1:
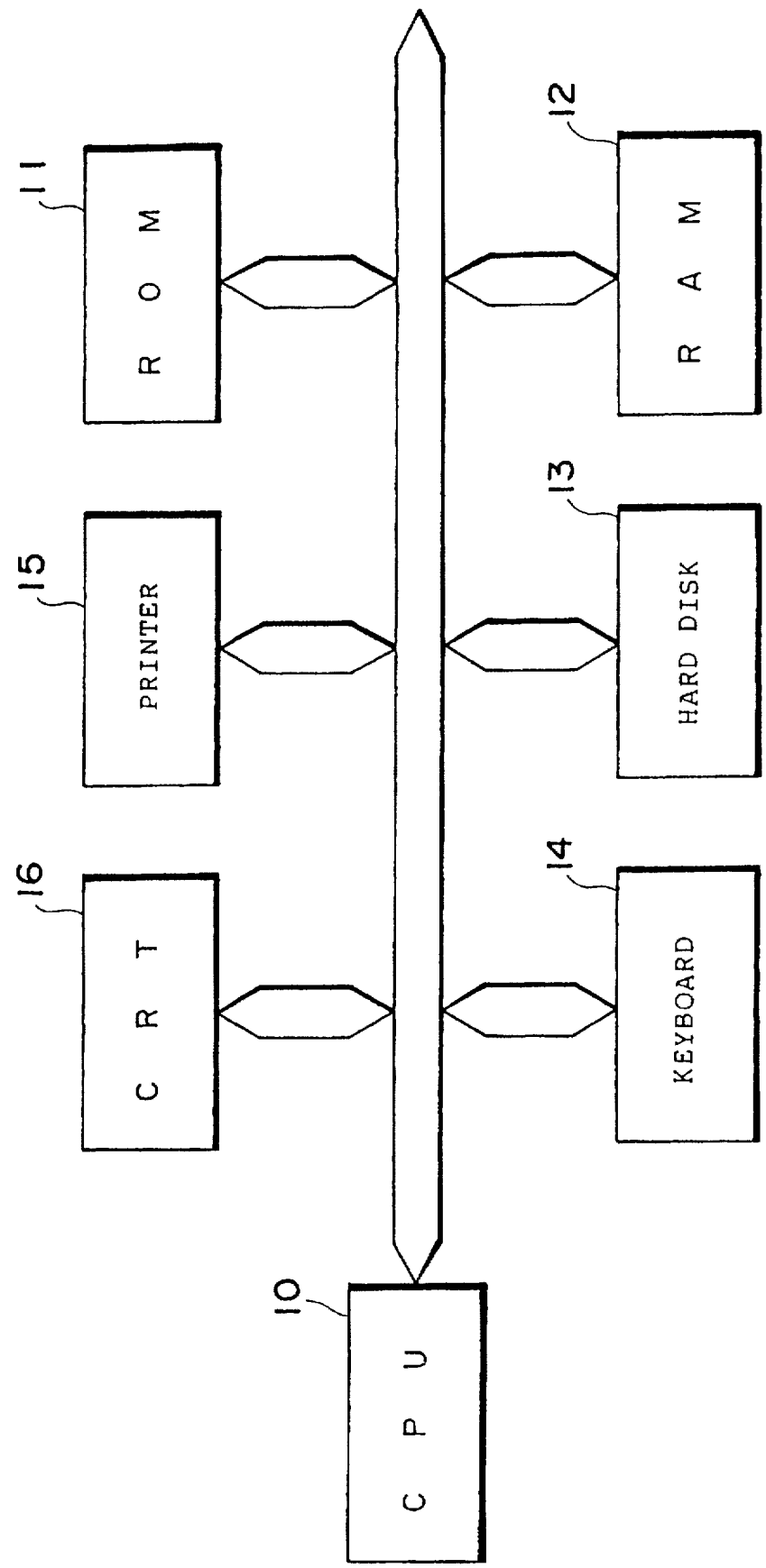
FIG. 1 is a block diagram illustrating the electrical configuration of a fuzzy retrieval apparatus according to an embodiment of the present invention.

FIG. 1 illustrates an example of the overall configuration of a fuzzy retrieval apparatus. The fuzzy retrieval apparatus is capable of being realized by a computer system and includes a CPU 10 for executing data-base creation processing and fuzzy retrieval processing, which will be described later in greater detail. A ROM 11, a RAM 12, a hard disk unit 13, a keyboard 14, a printer 15 and a CRT display unit 16 are connected to the CPU 10 via a system bus. The ROM 11 stores programs for data-base creation processing and fuzzy retrieval processing executed by the CPU 10 in accordance therewith. The RAM 12 is used as a work area and buffer area for various operations in the above-mentioned creation processing and retrieval processing. The hard disk unit 13 stores the data base and a fuzzy data dictionary. The keyboard 14 is used to enter input information for creation of the data base as well as retrieval conditions for fuzzy retrieval. The printer 15 and CRT display unit 16 output the results of fuzzy retrieval as visual information by printing the results on paper or displaying them on a screen.

Figure 2:
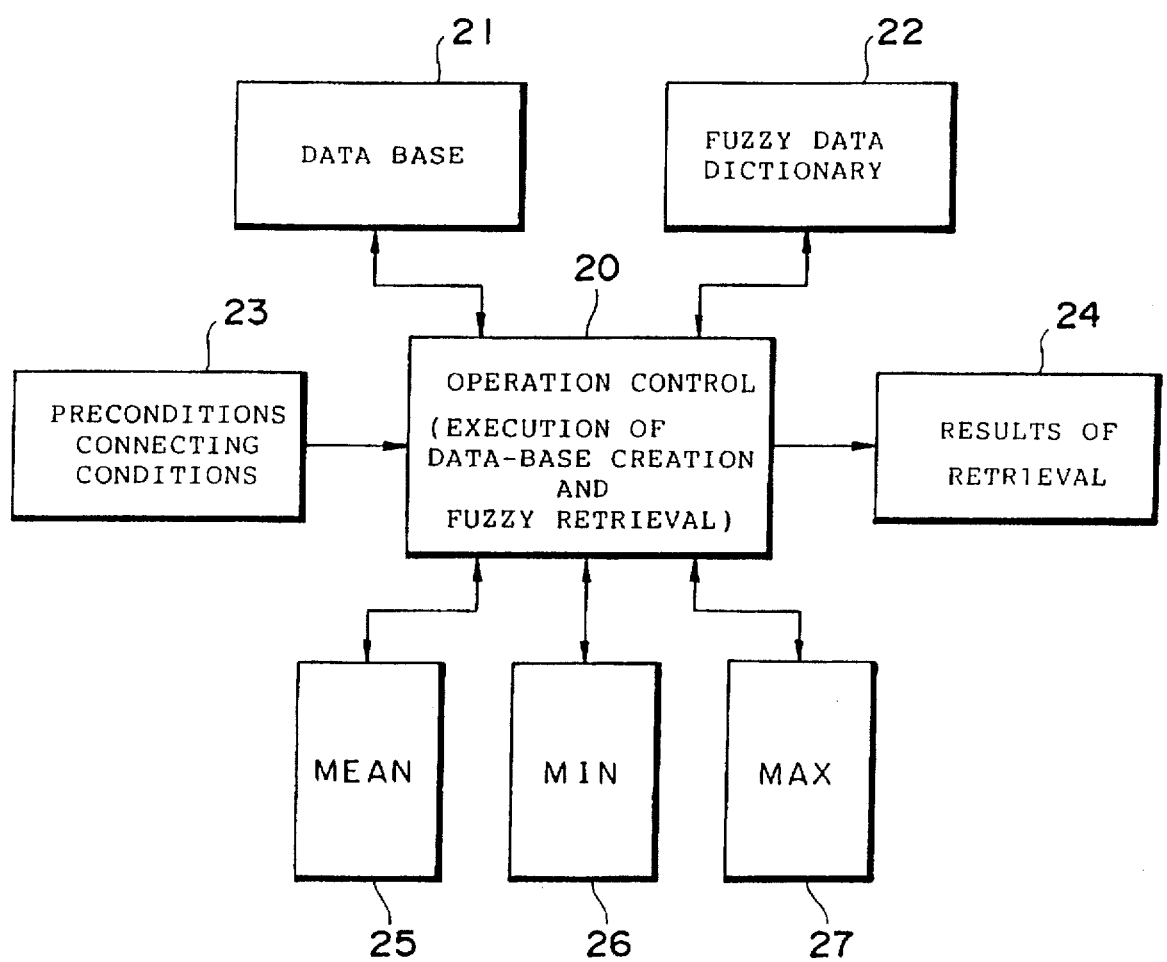
FIG. 2 is a functional block diagram showing a principal portion of the fuzzy retrieval apparatus according to the embodiment.

In order to describe the processing for data base creation and the processing for fuzzy retrieval, FIG. 2 illustrates the necessary functions in a form extracted from the system shown in FIG. 1. The functions of the CPU 10 are divided into a MEAN operation (calculation of mean value) 25, a MIN operation (selection of minimum value) 26, a MAX operation (selection of maximum value) 27 and operation control 20. The operation control 20 executes processing for creating a data base by referring to the fuzzy data dictionary 22 and executes fuzzy retrieval processing by referring to the data base 21 and the fuzzy data dictionary 22 and utilizing the MEAN operation 25, the MIN operation 26 and the MAX operation 27. The data base 21 and fuzzy data dictionary 22 are provided in the hard disk unit 13. Preconditions and connecting conditions 23 are entered from the keyboard 14 and stored in the RAM 12. Retrieved results 24 are outputted from the printer 15 or CRT display unit 16.

Processing for creating a data base will now be described.

An example of information entered in order to create a data base is illustrated in FIG. 4. It is assumed here that a data base regarding computer devices will be created. The name of each machine shall be referred to as an "item". Information related to an item shall be referred to as an attribute. In this embodiment, attributes are the price of the main body of the device, processing speed, memory capacity and name of the manufacturer.

In this embodiment, information representing an attribute is capable of being entered in three forms. The first is entry of a definite numerical value, e.g., a price for the main body of "1,500,000 yen", a processing speed of "4 MIPS" (MIPS= million instructions per second), and a memory capacity of "16 MB", etc. These are referred to as crisp numbers. The second is entry of an approximate numerical value using the word "about", e.g., a price for the main body of "about 2,500,000 yen", a processing speed of "about 7 MIPS", etc. These are referred to as fuzzy numbers. The third is entry by a linguistic expression, e.g., a processing speed that is "on the order of that of Machine A" or "very fast", a manufacturer's name of "Company A", etc. Among these linguistic expressions (or items of linguistic information), fuzzy linguistic expressions such as "on the order of that of Machine A" and "very fast" are referred to as fuzzy labels.

Figure 6:
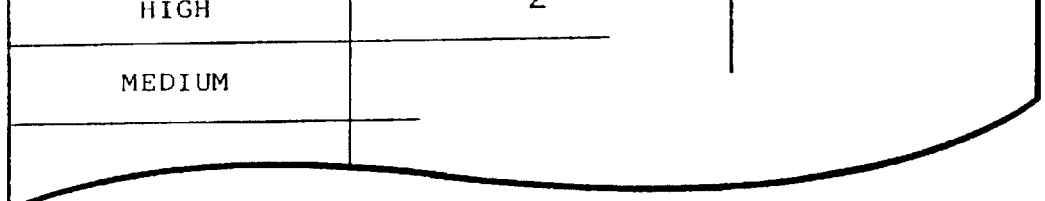
FIG. 6 illustrates an example of the content of a fuzzy data dictionary.

FIG. 6 illustrates an example of a fuzzy data dictionary. There are predetermined fuzzy linguistic expressions, and fuzzy label numbers and membership function coordinates have been decided in correspondence with these fuzzy linguistic expressions (fuzzy label names). It goes without saying that fuzzy linguistic expressions used when attributes are entered in order to create a data base and fuzzy linguistic expressions used when retrieval conditions, described below, are entered are limited to those already registered in the fuzzy data dictionary. The membership function coordinates will be described later. Fuzzy number ratios also are stored in the fuzzy data dictionary and will be described later.

Figure 3:
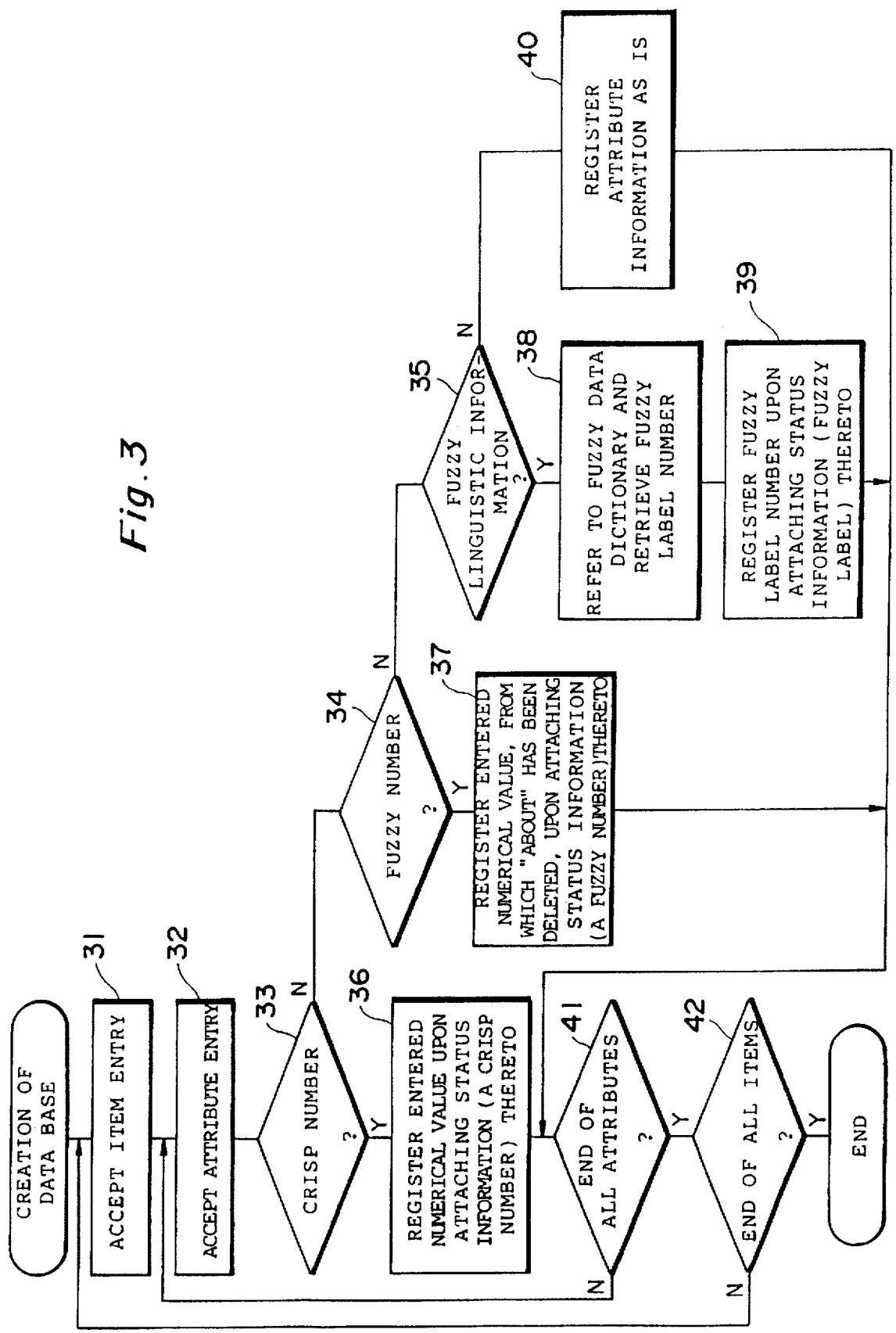
FIG. 3 is a flowchart showing processing for creating a data base.

FIG. 3 illustrates the flow of processing for creating a data base.

It will be assumed that the input information shown in FIG. 4 will be entered in order to create a data base. Further, an input of name of machine type, crisp numbers, fuzzy numbers and linguistic information (fuzzy labels) from the keyboard 14 is possible.

When information (name of machine type) regarding an item is entered, this is registered in the data base 21 (step 31). Items of information (price of main body, processing speed, memory capacity, manufacturer's name) regarding attributes are successively entered in relation to an entered name of machine type and these are stored in a buffer (step 32).

It is determined whether the entered attribute information is a crisp number, fuzzy number or fuzzy label (steps 33, 34, 35). If the attribute information is a price for the main body of "1,500,000 yen" or a processing speed of "4 MIPS", the information is a crisp number, as mentioned above. Therefore, the entered attribute information and codes representing the "crisp numbers" serving as status information regarding entered attribute information are registered in the data base 21 (step 36). In case of fuzzy information such as a price for the main body of "about 2,500,000 yen" and a processing speed of "about 7 MIPS", etc., "about" is deleted from the fuzzy numbers such as "about 2,500,000 yen" and "about 7 MIPS" and the fuzzy numbers are converted to crisp numbers. Crisp numbers thus obtained by conversion and "crisp number" codes serving as status information are registered at pertinent locations of the data base 21 (step 37). In a case where the entered attribute information is a fuzzy label such as that stating that processing speed is "on the order of that of Machine A" or "very fast", reference is made to the fuzzy data dictionary 22. A fuzzy label number representing an entered fuzzy label is read out of the fuzzy data dictionary 22 (step 38). The fuzzy label number read out is registered in a pertinent location of the data base 21 together with a code of the "fuzzy label" indicating the status information (step 39). In a case where the entered attribute information is definite linguistic information such as "Company A" and "Company B", this is stored in a pertinent location of the data base 21 as is or upon being converted into an appropriate code (step 40). These items of definite linguistic information should also be referred to as "crisp labels" as opposed to "fuzzy labels". Status codes referred to as crisp labels may or may not be registered in the data base 21.

The processing of steps 33~40 described above is repeated whenever each unit of a plurality of units of attribute information is entered with regard to a single unit of item information (the name of the type of machine) (step 41). When the entry of all attribute information regarding a single unit of item information and the processing for registering this attribute information in the data base end, the program proceeds to entry and processing for the next unit of item information (step 42). If entry of attribute data relating to all item information and registration of this attribute information end, this completes the creation of the data base of the kind shown in FIG. 5.

If particularly required, when a data base is created, the degree of credibility of attribute information is entered in addition to the item and attribute information and this is registered in the data base. An example of a data base to which degree of credibility has been added is shown in FIG. 5.

Degree of credibility is the result of representing the extent to which data is credible by a numerical value of 0~100. Conventionally, only data having a high precision is registered in a data base in order to improve the reliability of the data base. However, there are also cases in which newness of information is required even if the precision of the information is sacrificed to some extent. In order to deal with such cases, degree of credibility is attached to attribute data and then the attribute data is registered in the data base according to this embodiment. As a result, it is possible to register new information in the data base at an early stage. For example, the "degree of credibility" of a processing speed which is "very fast" of "machine type ZZ" is set to 30.

Fuzzy retrieval processing will be described next.

Figure 14:
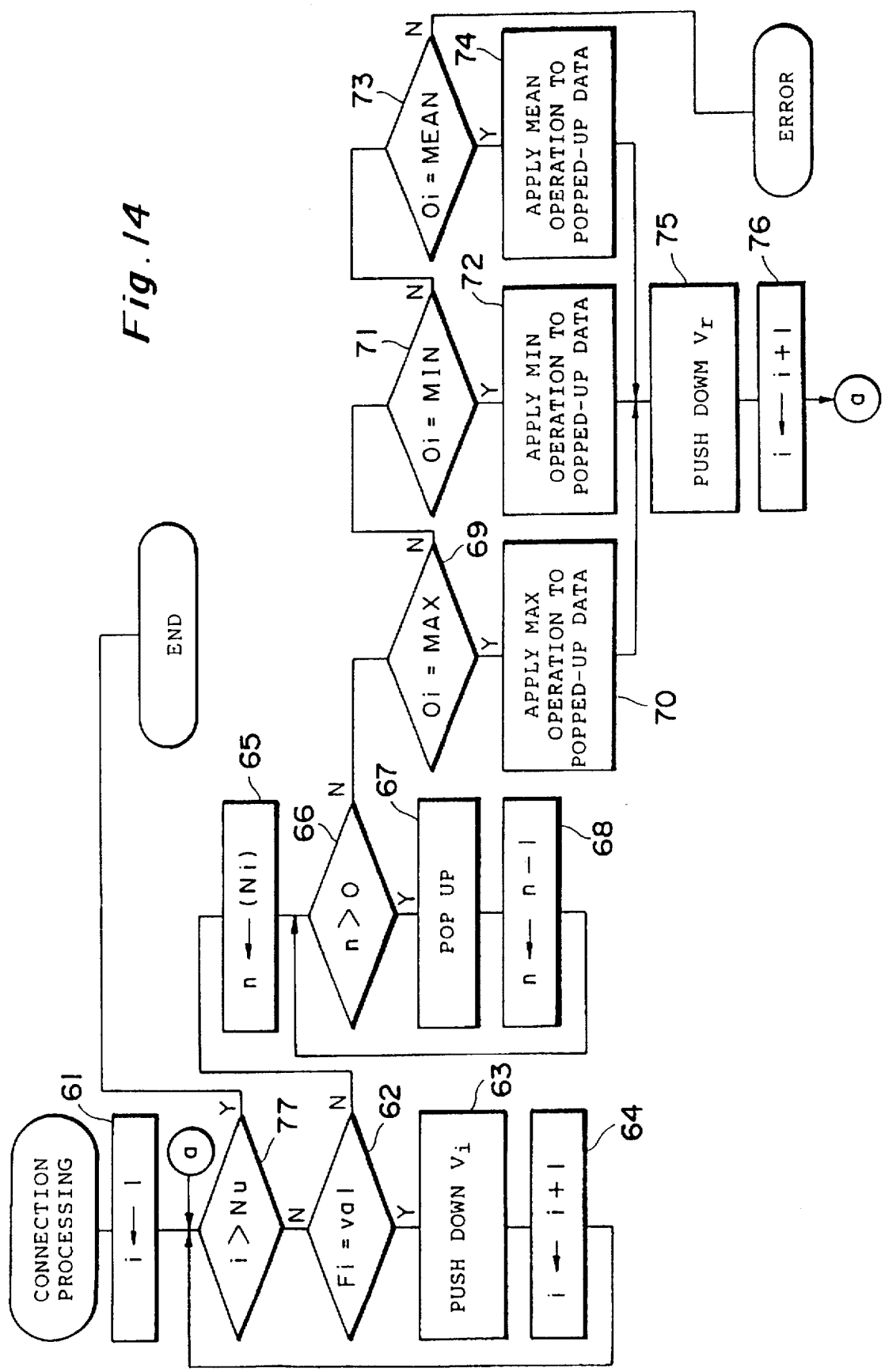
FIG. 14 is a flowchart illustrating connection processing.

Fuzzy retrieval processing is divided into processing for degree of membership and degree of importance (FIG. 7) and processing for connection (FIG. 14).

A retrieval condition is composed of preconditions and a connecting condition. A precondition generally employs a linguistic expression to describe the wish or requirement of a user with regard to each attribute. A connecting condition is a condition that connects a plurality of preconditions and, in this embodiment, is selected from among a MEAN operation, a MIN operation and a MAX operation.

According to this embodiment, it will be assumed that the following preconditions have been set with regard to price of the main body, processing speed, memory capacity and name of manufacturer:

Precondition

A: Price of main body is low

B: Speed of main body is fast

C: Memory capacity is greater than 32 MB

D: Name of manufacturer is Company A

The following are examples of connecting conditions:

| | |
|---|---|
| MIN {MEAN (A,B,C), D} | Eq. (1) |
| MEAN {A,B, MAX (C,D)} | Eq. (2) |

These retrieval conditions are entered from the keyboard 13. Alternatively, an arrangement may be adopted in which the user selects desired retrieval conditions from a number of retrieval conditions that have already been stored in memory (the hard disk 13 or the RAM 12)

Figure 7:
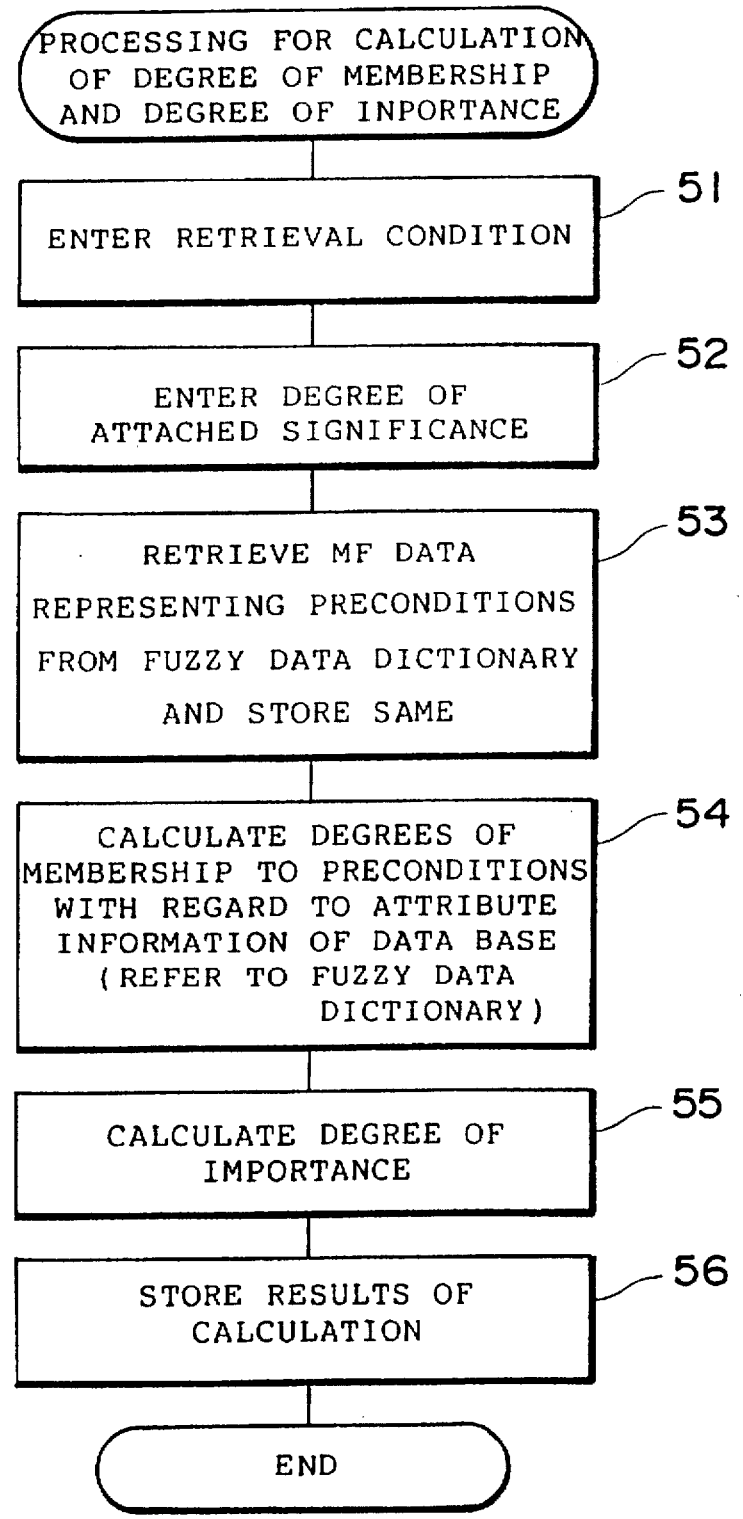
FIG. 7 is a flowchart illustrating processing for calculating degree of membership and degree of importance.

Processing for calculating degree of membership and degree of importance in accordance with given preconditions using the attribute data of the data base containing degree of credibility shown in FIG. 5 will now be described with reference to FIG. 7.

The above-mentioned retrieval conditions are entered or read out of the memory and stored in a buffer (step 51).

In a case where use is made of the data based to which degree of credibility has been added, the degree of significance to the user is entered, in addition to the retrieval conditions, for each and every precondition if the user so required (step 52).

The degree of attached significance refers to the extent to which the individual performing retrieval attaches significance to a precondition and is represented by a numerical value of 0~100. This makes it possible to perform practical application of information that has been "modulated". In other words, preconditions are weighted. In this example, the degree of attached significance of the precondition "price of main body is low" is set at 80, the degree of attached significance of "processing speed is fast" is set at 90, the degree of attached significance of "memory capacity is greater than 32 MB" is set at 90, and the degree of attached significance of "name of manufacturer is Company A" is set at 70 (see FIG. 13).

When the foregoing input processing ends, the program proceeds to processing for calculating degree of membership (steps 53, 54). Processing for calculating degree of membership differs depending upon whether a precondition is represented by fuzzy language (the preconditions A, B) or by definite crisp language (the preconditions C, D).

In a case where preconditions are represented by fuzzy linguistic information, reference is made to the fuzzy data dictionary 22, a membership function (MF) representing the preconditions is created and the membership function is stored in the buffer (RAM 12) (step 53).

Figure 8:
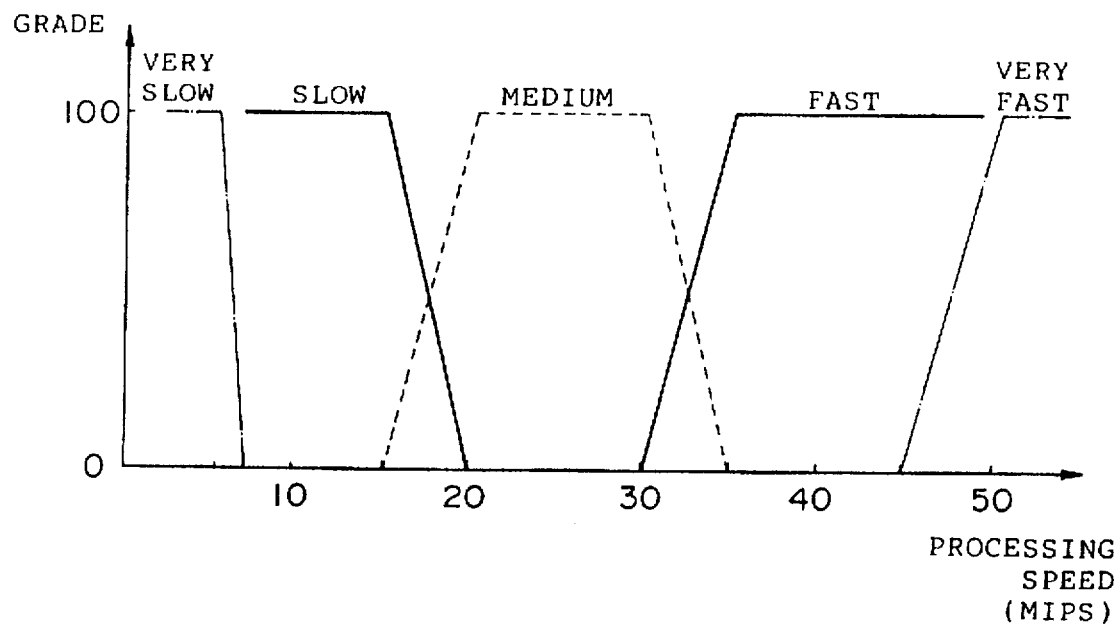
FIG. 8 is a graph showing an example of membership functions stored in the fuzzy data dictionary.

In the fuzzy data dictionary 22 shown in FIG. 6, a fuzzy label number of a fuzzy label name and membership function coordinates are stored beforehand for each and every fuzzy label name. The fuzzy labels have been described above. The membership function coordinates are coordinate data which specifies the membership function of the fuzzy label. In this embodiment, membership functions are trapezoidal in shape, as shown in FIG. 8, for the sake of simplicity. The membership function coordinates of the fuzzy label name "very fast" are 45, 50. With reference to FIG. 8, the membership function of "very fast" possesses a grade of value 0 over a range of processing speeds of 0~45 MIPS, rises linearly to the upper right at the position of 45 MIPS, attains a grade 100 at 50 MIPS and is maintained at the grade 100 at processing speeds above 50 MIPS. In general, the grade of a membership function is decided to be within a range of 0~1. In this embodiment, however, it is assumed that grade has a value in a range of 0~100 (the same is true with regard to degree of membership as well). Further, the membership function coordinates of "slow" are 15, 20. This membership function has a grade of 100 in a range of 0~15 MIPS, varies linearly from grade 100 to 0 in a range of 15~20 MIPS and has a grade of 0 in the region above 20 MIPS. Furthermore, the membership function coordinates of the fuzzy label name "medium" are 15, 20, 30, 35. This membership function has a grade of 0 in the range of 0~15 MPS, varies linearly from grade 0 to 100 in the range of 15~20 MIPS, has a grade of 100 in the range of 20~30 MPS, varies linearly from grade 100 to 0 in the range of 30~35 MIPS and has a grade of 0 in the region above 35 MIPS. Membership function coordinates are decided in the same manner also with regard to the fuzzy label "very high", "high" and "medium" relating to the price of the main body and to "on the order of that of Machine A" relating to processing speed. Membership functions are expressed based upon these membership function coordinates. In the processing of step 53, it will suffice to read membership function coordinates of a fuzzy label name representing retrieval conditions from the fuzzy data dictionary 22 and transfer these coordinates to the buffer.

Next, with regard to attribute information, which is related to a given precondition, from among the attribute information that has been stored in the data base 21, degree of membership with respect to the precondition (the membership function representing the precondition) is calculated (step 54). The manner in which degree of membership is calculated differs depending upon whether the attribute information is a crisp number, a fuzzy number or a fuzzy label.

Figure 10:
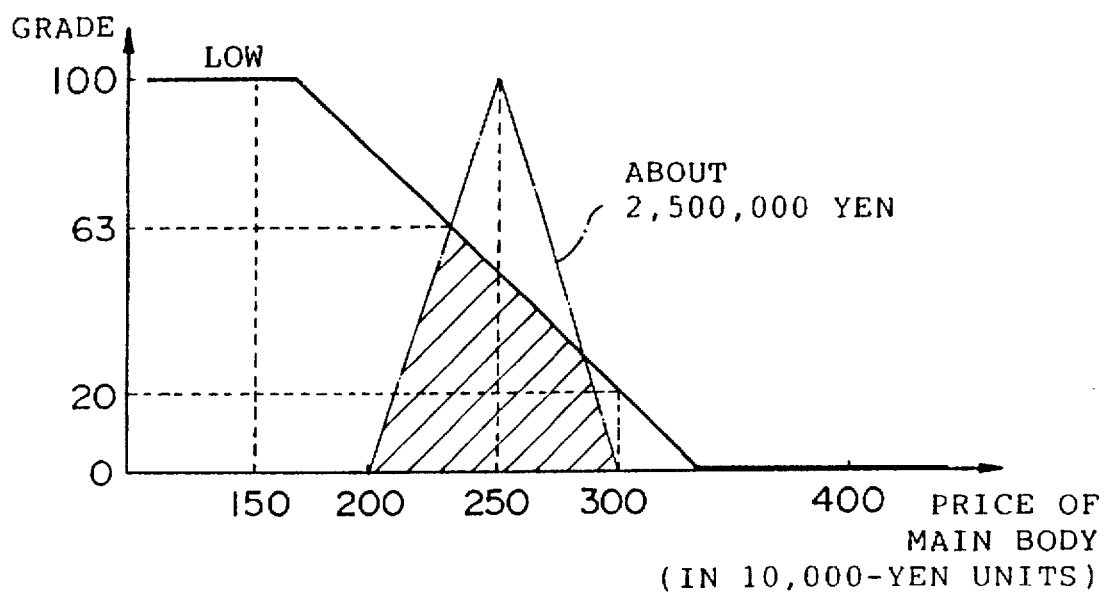
FIGS. 10 and 11 are graphs each showing the manner in which degree of membership is determined.

In a case where the attribute information is a crisp number, degree of membership is obtained by finding the membership function value (grade) with respect to the attribute information, in which the attribute information serves as a variable. A membership function to the effect that the price of the main body is "low" is illustrated in FIG. 10. In accordance with the data base 21, the price of the main body of machine name VV is a crisp number of 1,500,000 yen. In the membership function to the effect that the price of the main body is "low", the grade corresponding to 1,500,000 is 100. Accordingly, the degree of membership is obtained as 100. Similarly, the price of the main body of machine name XX is a crisp number of 3,000,000 yen, and the degree of membership is 20.

In a case where the attribute information is a fuzzy number, first a membership function representing the fuzzy number is created using the fuzzy number ratio in the fuzzy data dictionary 22, then the degree of membership is found by a MIN-MAX operation between the membership function of the fuzzy number and the membership function representing the precondition.

In principle, a membership function representing a fuzzy number is expressed by a triangle. The position (grade=100) of the apex of the triangle is represented by a value (this will be referred to as a representative value $R_o$) obtained by deleting "about" from the fuzzy value, and the positions (referred to as $R_n$, $R_p$) of the two end points (both points of the coordinates) (grade=0) are calculated from the following equations:

$$R_n = R_o \times (1 - \text{fuzzy number ratio} \div 100) \qquad \text{Eq. (3)}$$

$$R_p = R_o \times (1 + \text{fuzzy number ratio} \div 100) \qquad \text{Eq. (4)}$$

For example, the price of the main body of machine name WW in the data base 21 is "about 2,500,000 yen". Further, when the fuzzy data dictionary 22 is referred to, the fuzzy number ratio of the price of the main body is 20. Accordingly, in this case, we have $$R_o = 2,500,000 \text{ yen} \qquad \text{Eq. (5)}$$

$$R_n = 250 \times (1 - 20 \div 100) = 2,000,000 \qquad \text{Eq. (6)}$$

$$R_p = 250 \times (1 + 20 \div 100) = 3,000,000 \qquad \text{Eq. (7)}$$

Figure 9:
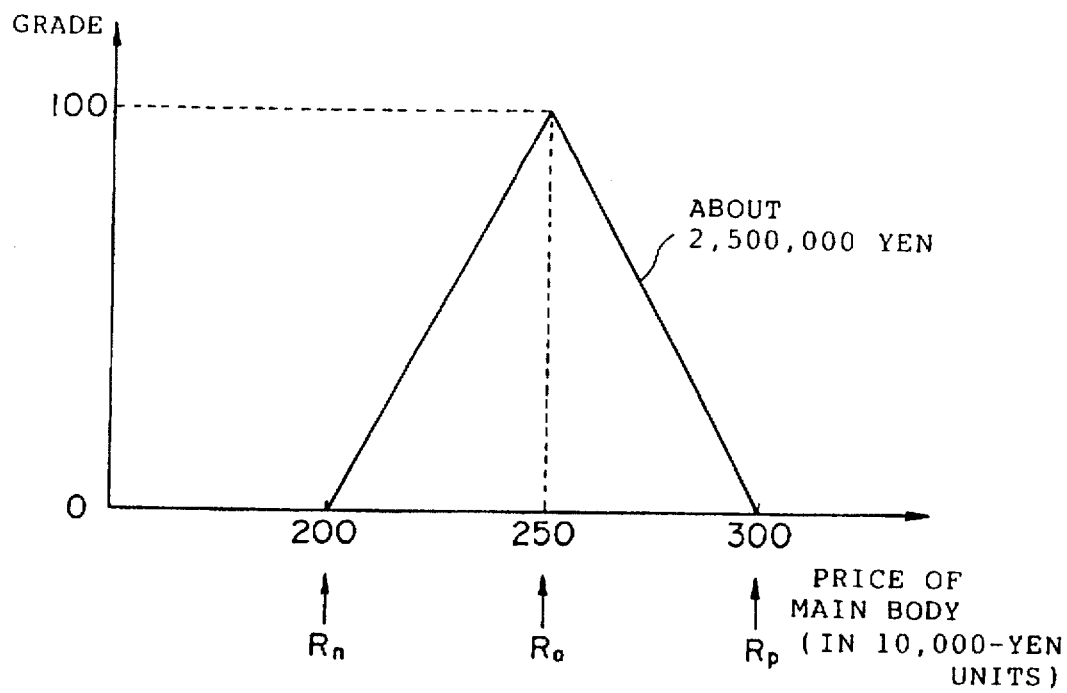
FIG. 9 is a graph showing the manner in which a membership function is created based upon a fuzzy number ratio stored in the fuzzy data dictionary.

This membership function is illustrated in FIG. 9.

Next, as illustrated in FIG. 10, a degree of membership of 63 is obtained by a MIN-MAX operation (the smaller of the points of intersection between two membership functions is selected) between the membership function of the fuzzy number "about 2,500,000 yen" and the retrieval condition "price of main body is low". In FIG. 10, the results of the MIN operation between two membership functions is represented by the broken line enclosing the hatched area. The maximum value (MAX) of these results is selected.

The membership function representing the processing speed "about 7 MIPS" of the same machine type WW is represented by the next three points $R_o$, $R_n$, $R_p$. The fuzzy number ratio of the processing speed is 10.

$$R_o = 7 \text{ MIPS} \qquad \text{Eq. (8)}$$

$$R_n = 7 \times (1 - 10 \div 100) = 6.3 \text{ MIPS} \qquad \text{Eq. (9)}$$

$$R_p = 7 \times (1 + 10 \div 100) = 7.7 \text{ MIPS} \qquad \text{Eq. (10)}$$

In a case where the attribute information is a fuzzy label, reference is made to the fuzzy data dictionary 22 to find the degree of membership by a MIN-MAX operation between a membership function represented by the membership function coordinates corresponding to the name of this fuzzy label and the membership function representing the precondition (this membership function also is obtained by referring to the fuzzy data dictionary 22 as set forth above).

Figure 11:
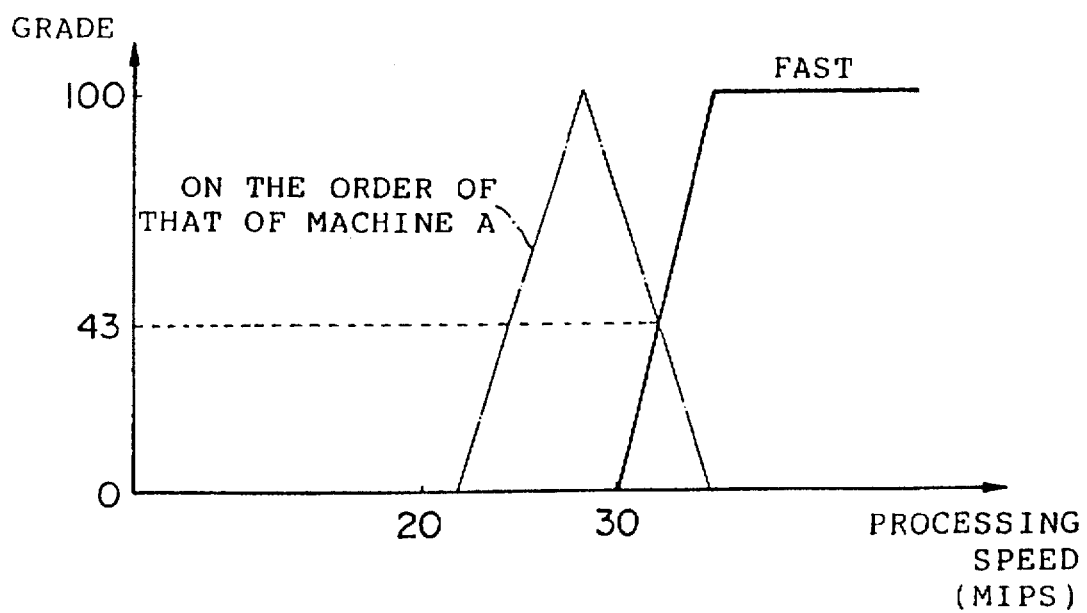

For example, with reference to FIG. 11, and in the case of machine type YY, the membership function of the processing speed "on the order of that of Machine A" is obtained from the fuzzy data dictionary 22. The membership function representing the retrieval condition "processing speed is fast" is obtained from the fuzzy data dictionary 22 in the same manner. The degree of membership is obtained as being 43 based upon the result of the MAX-MIN operation between these two membership functions.

In a case where a precondition is represented by crisp language, calculation of the degree of membership is simple. For example, with respect to the precondition in which the memory capacity is "greater than 32 MB", the degree of membership of the machine types WW, XX, YY for which the memory capacity is greater than 32 MB is 100 and the degree of membership of the other machine types is 0. Similarly, with regard to the precondition to the effect that the name of the manufacturer is "Company A", the degree of membership of the machine type VV for which the name of the manufacturer is Company A is 100 and the degree of membership of the other machine types is 0. In a case where the attribute information is a fuzzy number or a fuzzy label, reference is made to the fuzzy data dictionary 22 even if the precondition is a crisp number or a crisp language. A crisp number or crisp language is expressed by a function in which the grade rises vertically from 0 to 100 or falls vertically from 100 to 0. The degree of membership, therefore, is calculated by a MIN-MAX operation between the crisp function and the membership function represented by the attribute data.

Thus, the degrees of membership of all attribute information with respect to given preconditions are found. FIG. 12 illustrates an example of the degrees of membership obtained. This table of degrees of membership is outputted by the output unit (the printer or display unit 16) as necessary. The user is capable of selecting the optimum machine type from the degree-of-membership table outputted.

By adding status information to the data registered in the data base, not only crisp numbers but also fuzzy numbers and fuzzy linguistic information can be stored in the data base together with the crisp numbers, and this can be used as a data base for fuzzy retrieval processing.

Finally, by using the degree of credibility registered in the data base 21 and the entered degree of attached significance, degree of importance is calculated in accordance with the following equation for every item (name of machine type) that is the object of retrieval and attribute information (price of main body, processing speed, memory capacity and name of manufacturer) (step 55):

$$\text{degree of importance} = (\text{degree of credibility} \div 100) \times \qquad \text{Eq. (11)}$$

$$(\text{degree of attached significance} \div 100) \times 100$$

The results of calculating degree of importance are shown in FIG. 13. Either calculation of degree of membership (steps 52, 53, 54) or calculation of degree of importance (step 55) may be performed first.

The degrees of membership and degrees of importance thus obtained are stored in memory (the RAM 12, for example) (step 56).

The symbols of degree of membership and of degrees of importance are summarized here in order to be used in connection processing, which will be illustrated next:

Degree of membership of price of main body: $A_g$
Degree of membership of processing speed: $B_g$
Degree of membership of memory capacity: $C_g$
Degree of membership of manufacturer name: $D_g$
Degree of importance of price of main body: $A_w$
Degree of importance of processing speed: $B_w$
Degree of importance of memory capacity: $C_w$
Degree of importance of manufacturer name: $D_w$ In connection processing, degree of concurrence G for each item (machine type) with respect to a retrieval condition (inclusive of preconditions and a connecting condition) of attribute data, as well as degree of importance W of the degree of concurrence, is calculated using the degree of membership of each item of attribute data and the degree of importance of the attribute data (or precondition) with respect to the preconditions corresponding to these items of attribute data.

The method of calculating degree of concurrence G and the degree of importance W of the degree of concurrence differs depending upon the type of connecting operation. The method will be described for each type of connection operation.

In case of the MEAN operation:

$$\text{degree of concurrence } G = (\Sigma \text{ degree of membership} \times \text{degree of importance})/(\Sigma \text{ degree of importance}) \qquad \text{Eq. (12)}$$

$$\text{degree of importance } W = (\Sigma \text{ degree of importance}/n) \qquad \text{Eq. (13)}$$

The summation $\Sigma$ is performed with regard to all objects (arguments) of the MEAN operation. Further, n represents the number of objects (the number of arguments) of the MEAN operation. These points hold similarly also with regard to other operations.

In case of the MIN operation:

$$\text{Degree of concurrence } G = \text{minimum degree of membership} \qquad \text{Eq. (14)}$$

$$\text{Degree of importance } W = \text{degree of importance of minimum degree of membership} \qquad \text{Eq. (15)}$$

The minimum degree of membership mentioned here signifies the minimum degree of membership among a plurality of membership functions that are the object of a MIN operation.

In case of the MAX operation:

$$\text{Degree of concurrence } G = \text{maximum degree of membership} \qquad \text{Eq. (16)}$$

Degree of importance W=degree of importance of maximum
degree of membership  Eq. (17)

In general there are a plurality of preconditions. In a case where it is desired to obtain the mean value of membership functions of the corresponding data with respect to these preconditions, the MEAN operation is adopted. The MIN operation is employed in a case where it is desired to retrieve a value that satisfies all of a plurality of preconditions, and the MAX operation is employed in a case where it is desired to retrieve a value that satisfies any of the preconditions. If this is expressed in a different form, the MIN operation is adopted in a case where a plurality of preconditions are strongly connected or constrained, and the MAX operation is adopted in a case where a plurality of preconditions are loosely connected. The MEAN operation can be said to connect a plurality of preconditions at an intermediate level. In any case, the connecting condition is decided in accordance with the user's intention in performing retrieval.

As a concrete example, degree of membership G and degree of importance W shall be calculated under the connecting condition expressed by Equation (1). This will be described with reference to FIG. 19. FIG. 19 illustrates degrees of membership $A_g \sim D_g$ and degrees of importance $A_w \sim D_w$ already calculated, as well as degrees of membership G and degrees of importance W calculated, on the basis of $A_g \sim D_g$ and $A_w \sim D_w$, under the connecting condition expressed by Equation (1).

First, MEAN (A,B,C) is calculated. The degree of concurrence $G_1$ and degree of importance $W_1$ are calculated as shown below in relation to the machine type VV using Equation (12) and Equation (13).

Degree of concurrence $G_1$  Eq. (18)

$$= (A_g \times A_w + B_g \times B_w + C_g \times C_w)/(A_w + B_w + C_w)$$
$$= (100 \times 80 + 0 \times 90 + 0 \times 90)/(80 + 90 + 90)$$
$$= 30.7$$

Degree of importance $W_1$ $= (A_w + B_w + C_w)/3$  Eq. (19)
$= (80 + 90 + 90)/3$
$= 86.6$ Next, the MIN operation is performed using Equations (14) and (15).

Degree of concurrence $G$ $= \text{MIN}(G_1, D_g)$  Eq. (20)
$= \text{MIN}(30.7, 100)$
$= 30.7$ Degree of importance $W$ $=$ Degree of importance $W_1$  Eq. (21)
of $G_1$
$= 86.6$ Calculation is performed in the same manner with regard to other machine types as well. With regard to machine types other than machine type VV, the degree of membership $D_g$ is 0. Since this degree of membership $D_g$ is the object of the MIN operation, the final degree of membership G is 0. Thus, the MIN operation is convenient in a case where a value that satisfies both MEAN (A,B,C) and D is selected.

FIG. 20 illustrates the results of calculating the degree of concurrence G and the degree of importance w in accordance with the connecting condition expressed by Equation (2).

The process of calculation and the results are shown below with regard to machine type VV.

First, MAX (C,D) is calculated in accordance with Equations (16) and (17).

Degree of concurrence $G_2$ $= \text{MAX}(C_g, D_g)$  Eq. (22)
$= \text{MAX}(0, 100)$
$= 100$ Eq. (23)

Degree of importance $W_2$ $=$ Degree of importance $Dw$
of $D_g$
$= 60$

Degree of importance $W_2$=Degree of importance $Dw$ of $D_g$

Next, the MEAN operation is performed using Equations (12) and (13).

Degree of concurrence $G$  Eq. (24)

$$= (A_g \times A_w + B_g \times B_w + G_2 \times W_2)/(A_w + B_w + W_2)$$
$$= (100 \times 80 + 0 \times 90 + 100 \times 60)/(80 + 90 + 60)$$
$$= 60.8$$

Degree of importance $W$ $= (A_w + B_w + W_2)/3$  Eq. (25)
$= 76.6$

Degree of concurrence G and degree of importance W are calculated in the same manner with regard to other machine types as well. Since the connecting operation of Equation (2) includes the MEAN operation, the mean degree of concurrence G and the degree of importance W are obtained and the difference between machine types is small in comparison with the operational results that are in accordance with Equation (1) shown in FIG. 19. It should be noted that since the degrees of membership $C_g$, $D_g$ are both 0 with regard to the machine type ZZ, the degree of concurrence of MAX (C,D) is 0 and $C_w$=90 is used as the degree of importance.

These operational results relating to the degree of concurrence G and degree of importance W are outputted as the results of retrieval from the printer 15 and CRT 16. The user carries out decision making on the basis of the results of retrieval.

FIG. 14 illustrates an example of the processing procedure of the CPU 10, which executes the above-described connecting operation.

A given connecting condition is stored in a retrieval-condition buffer upon being converted into a form suited to connection processing. An example of a form suited to connection processing is illustrated in FIG. 15 with regard to Equation (1). The row of columns is formed in the retrieval-condition buffer. A Column No. is assigned to each column. In accordance with the operational expression of Equation (1), data or operators are stored successively in each column starting from the term at the rear of the equation.

A flag is provided at the head of each column. A flag regarding data is indicated by "val", and a flag regarding an operator is indicated "ope".

With regard to data, degree of membership and degree of importance are stored in the flag items in each column. With regard to operators, an operator code and the number of arguments thereof (the number of objects of the operation) are stored after the flag in each column.

Equation (1) is arranged in the order D, C, B, A, MEAN, MIN starting from the rear. Accordingly, the degrees of membership ($D_g \sim A_g$) and the degrees of importance ($D_w \sim A_w$) of D, C, B and A are arrayed with regard to column Nos. 1~4. Since the MEAN operation has A, B and C as the objects of the operation, the operator code is MEAN and the number of arguments is three. Since the MIN operation has the result of the MEAN operation and D as the objects of the operation, the operator code is MIN and the number of arguments is two.

The order of the columns suited to the operation of Equation (2) is illustrated in FIG. 18.

In the processing shown in FIG. 14, Column No. is represented by i, the flag of each column by $F_i$, the data by $V_i$ (degree of membership and degree of importance), the operator by $O_i$ and the number of arguments by $(N_i)$ (see FIGS. 16a and 16b). Further, as shown in FIG. 17, an LIFO (last in first out) buffer is provided.

With reference to FIG. 14, 1 is set in a counter i, which indicates the Column No. (step 61). The flag $F_i$ of Column No. designated by the counter i is read out and it is determined whether the flag $F_i$ is val or ope (step 62). If flag $F_i$ is val, this is indicative of data and therefore the data $V_i$ of this column is pushed down in the LIFO buffer (step 63). The counter i is incremented (step 64) and the program returns to step 62 via step 77. The flag $F_i$ of the column designated by the counter i that has been incremented is read out and checked. Thus, data read out of the column is stored in the LIFO buffer in the order in which it was read out.

In a case where the flag $F_i$ read out of a column is ope, the number $(N_i)$ of arguments is read out of this column and set in a counter n, which is for counting the number of arguments (step 65). The data from the LIFO buffer pops up and is stored in a work area (which is provided in the RAM 12, for example) (step 67). While the counter n is decremented (step 68), the reading of data out of the LIFO buffer continues until the value in counter n becomes 0 (step 66).

When counter n becomes 0, it is determined whether the operator $O_i$ of the column for which the flag was ope is MAX, MIN or MEAN (steps 69, 71, 73). The data that popped up from the LIFO buffer and was stored in the work area previously is operated upon in accordance with this operator (steps 70, 72, 74).

For instance, in the example shown in FIG. 15, when the flag ope of Column No. 5 has been read out, the number (3) of arguments is set in the counter n. Accordingly, data $A_g$ $(A_w)$, $B_g$ $(B_w)$, $C_g$ $(C_w)$ is read out of the LIFO buffer and the MEAN operation is applied to these items of data (step 74) [e.g., the operations of Equations (18), (19) are performed].

The operational results [e.g., $G_1$, $W_1$ of Equations (18), (19)] are pushed down in the LIFO buffer as data Vr (step 75). The counter i is then incremented (step 76) and the program returns to step 77.

In the example shown in FIG. 15, the flag $F_i$=ope is read out again, two items of data $V_r(G_1,W_1)$ and $D_g(D_w)$ are read out of the LIFO buffer and these items of data are subjected to the MIN operation (step 72) [the operations of Equations (20), (21)].

When the value of counter i exceeds the total number $N_u$ of columns (step 77), connection processing regard one item (one machine type) ends. Columns as shown in FIGS. 15 or 18 are created with regard to the other machine types as well, and the connecting operation is performed in similar fashion.

Figure 21:
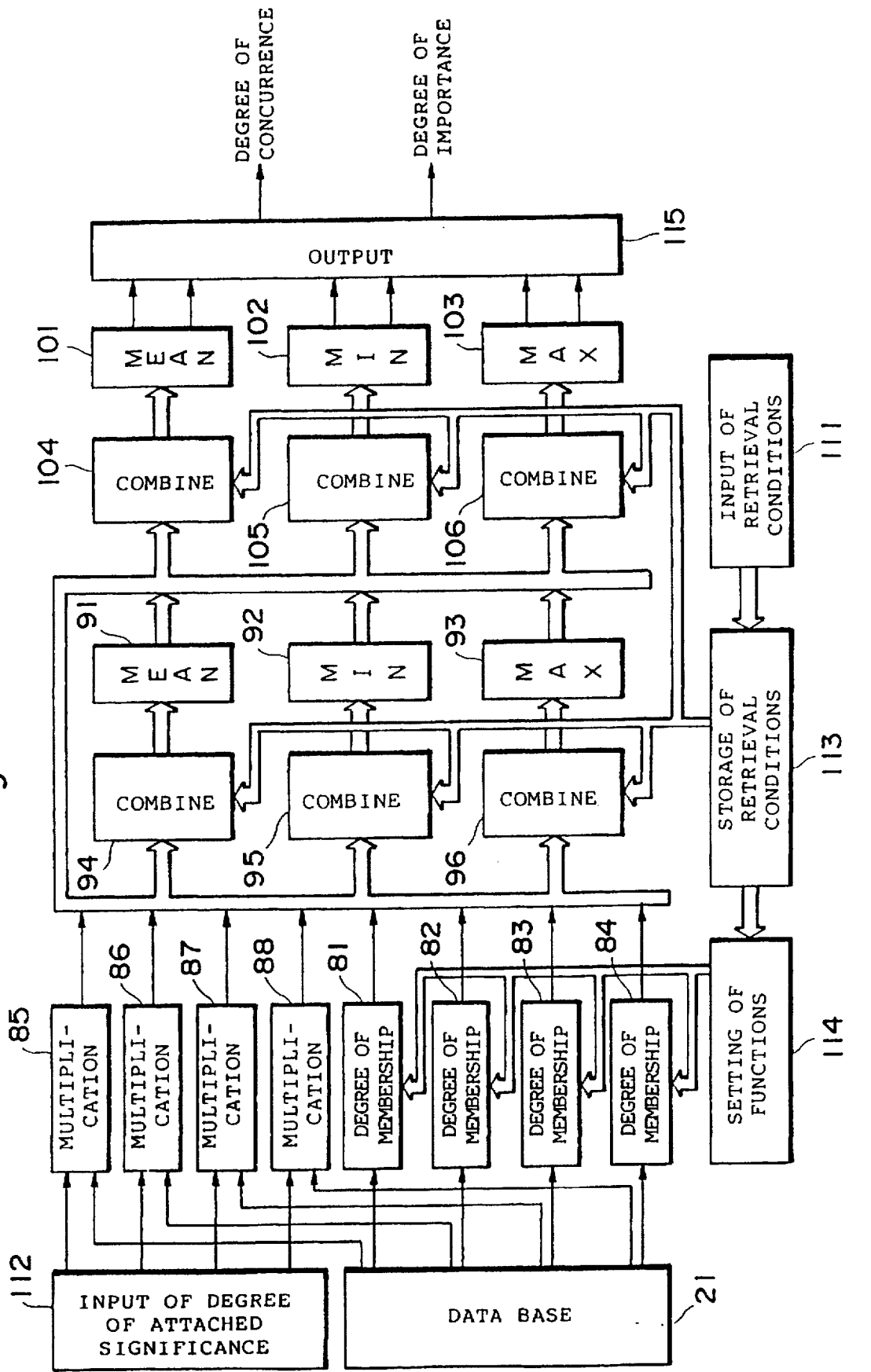
FIG. 21 is a block diagram showing a fuzzy retrieval apparatus composed of hardware.

FIG. 21 illustrates an example of a hardware configuration for performing the above-described calculation of degree of membership and degree of importance as well as the connecting operation.

A retrieval condition (preconditions and a connecting condition) is entered from a retrieval-condition input unit 111, and the degree of attached significance of each attribute is entered from an input unit 112 for entering degree of attached significance. The retrieval condition that has been entered from the retrieval-condition input unit 111 is stored in a retrieval-condition memory device 113. The retrieval-condition memory device 113 controls a function setting unit 114 based upon the preconditions in the stored retrieval condition and controls combination logic circuits 94, 95, 96, 104, 105, 106 based upon the connecting condition.

When preconditions have been provided by the retrieval-condition memory device 113, the function setting unit 114 sets membership functions or crisp functions representing respective ones of the preconditions A, B, C and D in degree-of-membership operational units 81, 82, 83 and 84. Meanwhile, attribute data (price of the main body, processing speed, memory capacity and manufacturer name) of each item (machine type) stored in the data base 21 is applied to the degree-of-membership operational units 81, 82, 83 and 84. The degree-of-membership operational units 81, 82, 83 and 84 calculate the degrees of membership of the given attribute data with respect to the set function. It goes without saying that when given attribute data contains a status code indicating that it is a fuzzy number or fuzzy label, the calculation of degree of membership is carried out upon creation of the membership function based upon the attribute data.

The degrees of attached significance of each of the attributes entered from the input unit 112 are applied to multiplier circuits 85~88, respectively. Credibility data (or signals) read out of the data base 21 for each of the items (machine types) also are applied to the multiplier circuits 85~88. As a result of multiplying mutually corresponding degrees of attached significance and degrees of credibility together in the multiplier circuits 85~88, data representing degree of importance is obtained.

Though a connecting condition is capable of containing a plurality of operators (MEAN, MAX, MIN), here it is assumed that two operators are contained, as indicated by Equation (1) or Equation (2). In order to perform an operation in accordance with a maximum of two operators contained in a connecting condition, sets of MEAN, MAX and MIN operational units are cascade-connected in two stages. More specifically, these units are operational units 91, 92, 93, 101, 102, 103. In order to select data to be entered in the operational units 91~93 and 101~103, combination logic circuits 94~96, 104~106 are connected in front of the operational units 91~93, 101~103, respectively. The outputs (the calculated degrees of membership) from the degree-of-membership operational units 81~84 and the outputs (the calculated degrees of attached significance) from the multiplier circuits 85~88 enter combination logic circuits 94~96, respectively. In order that operations may be performed in accordance with the initial operator in the connecting condition that has been stored in the retrieval-condition memory device 113, the combination logic circuits 94~96 selects the operational unit (any one of 91~93) corresponding to this operator and input data to be operated upon is applied to the operational unit selected. The outputs of the degree-of-membership operational units 81~84, the outputs of the multiplier circuits 85~88 and the outputs (the operational results) of the operational units 91~93 are applied to the combination logic circuits 104~106, respectively. In order that the operation in accordance with the next operator in the connecting condition may be executed by the operational unit (any one of 101~103) that corresponds to this operator, the combination logic circuits 104~106 select the input and apply it to this operational unit.

The final operational results obtained from any one of the operational units 101~103 are applied to an output circuit 115, which delivers an output signal of a prescribed effect (current, voltage or binary data) representing the degree of concurrence G and the degree of importance W.

For example, in a case where a connecting operation in accordance with Equation (1) is performed, the outputs of the degree-of-membership operational units 81–83 and the outputs of the multiplier circuits 85–87 are applied to the MEAN operational unit 91 via the combination logic circuit 94. Further, the output of the MEAN operational unit 91, the output of the degree-of-membership operational unit 84 and the output of the multiplier circuit 88 enter the MIN operational unit 102 via the combination logic circuit 105.

The units and circuits shown in FIG. 21 can be implemented by electronic circuitry having a special-purpose hardware architecture or by a microcomputer that executes processing in accordance with the above-described procedure.

Finally, degree of contribution will be described. Degree of contribution is obtained for each precondition with respect to a given connecting condition. Let $N_c$ represent the degree of contribution of a precondition N (N=A, B, C, D).

In case of a MEAN operation:

$$N_c = \text{(degree of membership} \times \text{degree of importance:with regard to } N) \times 100/(\Sigma \text{ degree of membership} \times \text{degree of importance)} \quad \text{Eq. (26)}$$

$\Sigma$ is summed with regard to all preconditions that are the object of an operation.

For example, the degree of contribution $A_c$ of precondition A is given by the following [in a case of MEAN (A,B,C,D)]:

$$A_c = (A_g \times A_w) \times 100/(A_g \times A_w + B_g \times B_w + C_g \times C_w + D_g \times D_w) \quad \text{Eq. (27)}$$

In case of a MIN operation:

$$N_c = \begin{cases} 100 : \text{if } N_g \text{ is minimum} \\ 0 : \text{if } N_g \text{ is not minimum} \end{cases} \quad \text{Eq. (28)}$$

For example, the degree of contribution $A_c$ of precondition A is $$A_c = \begin{cases} 100 : \text{if } A_g \text{ is minimum} \\ 0 : \text{if } A_g \text{ is not minimum} \end{cases} \quad \text{Eq. (29)}$$

In case of a MAX operation:

$$N_c = \begin{cases} 100 : \text{if } N_g \text{ is maximum} \\ 0 : \text{if } N_g \text{ is not maximum} \end{cases} \quad \text{Eq. (30)}$$

For example, the degree of contribution $A_c$ of precondition A is $$A_c = \begin{cases} 100 : \text{if } A_g \text{ is maximum} \\ 0 : \text{if } A_g \text{ is not maximum} \end{cases} \quad \text{Eq. (31)}$$

As one example, the degree of contribution under the connecting condition represented by Equation (1) shall be calculated in relation to machine type VV.

Equation (1) is MIN {MEAN(A,B,C), D}. The MIN operation is carried out first in relation to the degree of contribution.

The degree of membership GI of MEAN (A,B,C) is 30.7 from Equation (18).

The degree of membership $D_g$ of the precondition D is 100 from FIG. 12.

Accordingly, the degree of membership $G_1$ of MEAN (A,B,C) is smaller. From Equation (28), we have the following:

the degree of contribution of MEAN (A,B,C) is 100, and the degree of contribution $D_c$ of precondition D is 0.

Furthermore, the degree of contribution of MEAN (A,B, C) is distributed among preconditions A, B, C utilizing Equation (26).

$$A_c = (100 \times 80) \times 100/(100 \times 80 + 0 \times 90 + 0 \times 90) = 100 \quad \text{Eq. (32)}$$

Similarly, $B_c=0$, $C_c=0$.

With regard to other machine types, the degree of membership $D_g$ is 0. Therefore, the degree of contribution $D_c$ of precondition D is 100 and the degrees of contribution of preconditions A, B, C are 0.

FIG. 22 illustrates the degrees of contribution thus obtained when shown in the form of a table along with degree of membership G and degree of importance W.

In the above-described embodiment, degree of importance W is calculated, for each attribute, based upon degree of importance obtained as the product between degree of credibility and degree of attached significance. Since the degree of importance W is data representing weighting, this may be calculated based solely upon the degree of credibility, calculated based solely upon degree of attached significance or need not necessarily be calculated.

Industrial Applicability

A fuzzy retrieval apparatus and an apparatus for creating membership functions are manufactured in the computer industry and find use in a wide variety of industries inclusive of the computer industry.

What is claimed is:

1. A fuzzy retrieval apparatus comprising:

a data base in which a plurality of types of attribute signals with respect to an item of a plurality of items are registered in advance for each item;

a fuzzy data dictionary for storing, with respect to a fuzzy amount, data representing a membership function of the fuzzy amount;

means for setting signals representing a retrieval condition which comprises at least two preconditions each indicating a desired condition relating to at least one of the plurality of types of the attribute signals, and a connecting condition that connects these preconditions;

membership operating means for producing degree-of-membership signals that indicate the degrees to which an attribute signal conforms to set preconditions, said membership operating means producing the degree-of-membership signal using a membership function obtained with reference to said fuzzy data dictionary with respect to at lest one of the preconditions and the attribute signal which is the fuzzy amount;

MEAN operating means for producing and outputting a signal indicating a mean value of a plurality of applied degree-of-membership signals;

MIN operating means for selecting and outputting a signal, which indicates a minimum value, from a plurality of applied degree-of-membership signals;

MAX operating means for selecting and outputting a signal, which indicates a maximum value, from a plurality of applied degree-of-membership signals, and control means for applying the degree-of-membership signals obtained from the membership operating means to at least one of the MEAN operating means, MIN operating means and MAX operating means in accordance with a predetermined connecting condition, and outputting a degree-of-concurrence signal obtained from a final stage of at least one of the MEAN operating means, MIN operating means and MAX operating means.

2. A fuzzy retrieval apparatus according to claim 1, wherein said means for setting retrieval conditions comprises input means for entering retrieval-condition signals.

3. A fuzzy retrieval apparatus according to claim 1, wherein said means for setting retrieval conditions comprises means for storing a plurality of retrieval-conditions signals in advance, and means for selecting at least one of said retrieval-condition signals from the retrieval-condition signals that have been stored.

4. A fuzzy retrieval apparatus according to claim 1, wherein said membership operating means produces said degree-of-membership signal for each item with regard to all preconditions that have been set, and said control means controls said at least one of the MEAN operating means, MIN operating means and MAX operating means in such a manner that a degree-of-concurrence signal is obtained for each and every item.

5. A fuzzy retrieval apparatus according to claim 1, wherein said control means applies an output signal from said MEAN operating means, said MIN operating means or said MAX operating means to at least one of MEAN operating means, MIN operating means and MAX operating means in accordance with the predetermined connecting condition.

6. A fuzzy retrieval apparatus according to claim 1, further comprising means for producing a plurality of weight signals, each weight signal representing a weight of a degree-of-membership signal;

said MEAN operating means, MIN operating means and MAX operating means performing operations corresponding to a MEAN operation, MIN operation and MAX operation, respectively, with regard to said plurality of weight signals applied together with the degree-of-membership signals; and said control means applying said plurality of weight signals to at least one of MEAN operating means, MIN operating means and MAX operating means together with the degree-of-membership signals, and outputting a signal, which represents degree of importance obtained from the final stage of said at least one of MEAN operating means, MIN operating means and MAX operating means, together with the degree-of-concurrence signal.

7. A fuzzy retrieval apparatus according to claim 1, wherein said means for producing a plurality of weight signals comprises a data base in which, together with the attribute signals, there are registered signals representing degrees of credibility of the attribute signals, means for entering a signal, which represents degree of attached significance, for each attribute, and multiplying means for multiplying a signal representing degree of credibility and a signal representing degree of attached significance together and outputting a weight signal.

8. A fuzzy retrieval apparatus according to claim 1, wherein said means for producing a plurality of weight signals is a data base in which, together with the attribute signals, there are registered weight signals representing degrees of credibility of the attribute signals.

9. A fuzzy retrieval apparatus according to claim 1, wherein said means for producing a plurality of weight signals is means for entering, for each attribute, a weight signal representing degree of attached significance of the attribute.

10. A fuzzy retrieval method, comprising the steps of:

registering, in a data base, in advance for each item of a plurality of items, a plurality of types of attribute signals with respect to an item of said plurality of items;

providing a fuzzy data dictionary, in advance, for storing, with respect to a fuzzy amount, data representing a membership function of the fuzzy amount;

setting signals representing a retrieval condition comprising a plurality of preconditions indicating desired conditions relating to at least one of the plurality of types of attribute signals, and a connecting condition that connects these preconditions;

producing signals representing degrees of membership that indicate the degrees to which an attribute signal conforms to a predetermined precondition, using a membership function obtained with reference to said fuzzy data dictionary if the precondition and/or the attribute signal is the fuzzy amount;

executing at least one of a MEAN operation, MIN operation and MAX operation in accordance with a predetermined connecting condition and with regard to the degree-of-membership signals obtained from the degree-of-membership producing step, wherein the MEAN operation is for producing a signal indicating a mean value of the degree-of-membership signals, the MIN operation is for selecting a signal, which indicates a minimum value, from the degree-of-membership signals, and the MAX operation is for selecting a signal, which indicates a maximum value, from the degree-of-membership signals, and outputting a signal representing the degree of concurrence obtained by executing the operation.

* * * * *